Oct. 6, 1953  R. J. COOPER  2,654,569
PIPE JACK AND ADAPTER
Original Filed Sept. 14, 1944
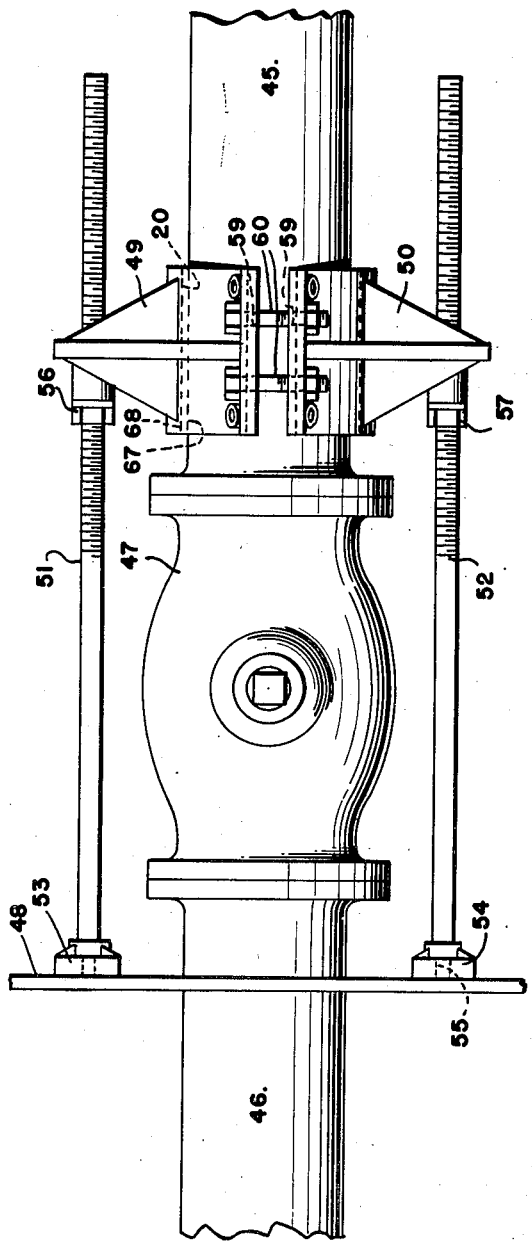
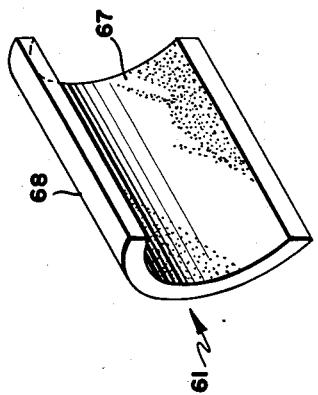
INVENTOR
ROSS J. COOPER
BY *A. H. Helmestun*
ATTORNEY Patented Oct. 6, 1953

2,654,569

UNITED STATES PATENT OFFICE 2,654,569

PIPE JACK AND ADAPTER

Ross J. Cooper, Toledo, Ohio

Original application September 14, 1944, Serial No. 554,139, now Patent No. 2,514,374, dated July 11, 1950. Divided and this application March 27, 1950, Serial No. 153,285

2 Claims. (Cl. 254—100)

(Granted under Title 35, U. S. Code (1952), sec. 266)

The present application is a division of the copending application of Ross J. Cooper, Serial Number 554,139, filed September 14, 1944, for Pipe Jacks.

This invention relates to improvements in a pipe fitting tool and more particularly to a device used to separate flanged joints in steam lines and the like.

The joints in pipe lines, particularly those carrying high pressure and high temperature steam, are subject to freezing, that is to say, they are difficult to break or separate, and make the removal of valves, pipes and other parts very difficult. Such joints usually comprise the flanged ends of a pair of pipes in axially abutting relation with a gasket therebetween. Heretofore the practice has been to drive a cold chisel in the joint desired to be separated in order to break it free. This invariably damages the abutting surfaces of the flanges, requiring the refinishing thereof before they can be rejoined, and destroys the gasket.

The present invention has for its object the provision of means for breaking flanged pipe joints without damage thereto.

It is a further object of this invention to provide a tool for axially separating frozen joints in pipe lines.

It is a further object of this invention to provide a tool for separating joints in pipe lines with interchangeable parts capable of use in a variety of ways.

Fig. 1 is a side view of the invention and Fig. 2 is a perspective view of an adapter drawn on a larger scale.

The modification disclosed in Fig. 1, shows the use of the device for breaking flanged joints in a pipe line where the lower clamp cannot be affixed to the pipe by reason of the fact that the line passes through a bulkhead or some other obstruction. A pipe line composed of pipes 45, 46 and a valve 47 passes through bulkhead 48. Two pipe clamps 49 and 50 are bolted together on opposite sides of the pipe 45 by means of bolts 60 passing through holes 59 in the flanges. The use of two clamps, as shown, is desirable for large diameter pipes, but one thereof will suffice for small sizes of pipes.

Rods 51 and 52 are positioned in paralled relationship with pipes 45 and 46 and are screw threaded throughout a substantial portion of their lengths, as clearly shown in Figure 1. The ends of the rods remote from the pipe clamps are shaped in the forms of a square having a plurality of flat sides which are adapted to engage or fit into shoes 53 positioned against bulkhead 48. The shoes 53, in the form illustrated, are identical and comprise an apertured center 55 having a plurality of flat sides equal in number to that machined on rods 51 and 52 and the aperture is of a size which will conveniently receive the squared ends of rods 51 and 52 so as to prevent turning of the rods when the latter and the shoes are mated together. The underside of the shoes may be roughened in order to prevent slipping of same when it is positioned against the bulkhead and brought into use. The screw threaded ends of rods 51 and 52 respectively pass through holes of cylindrical shape formed on the outer end of clamps 49 and 50 and nuts 56 and 57 are positioned on the rods for bearing against the clamps when turned in a direction away from the bulkhead.

The operation of the device is as follows:

When it is desired to break a frozen flanged joint, rods 51 and 52 are respectively positioned within the cylindrical holes in clamps 49 and 50 and the latter are then clamped to the pipe 45 on the far side of the flanged joint from the bulkhead. After the clamps are secured to the pipe, shoes 53 and 54 are located on the bulkhead, rods 51 and 52 fitted thereinto and nuts 56 and 57 then turned until contact is made with the flanged ends of clamps 49 and 50. At this time, the clamps, rods and shoes are appropriately aligned and the nuts then alternately turned against the clamps, thus imparting a force through the clamps to pipe 45 until separation of pipe 45 and valve 47 occurs. It is to be noted that pipe 46 will not move during this process since it is welded to bulkhead 48 in the customary manner.

The pipe clamps shown are for but one size of pipe and to provide for other sizes, without recourse to a different clamp for each, several sizes of adapters are used. These adapters 61 are segments of cylinders as shown in Fig. 2 and fit between the clamp and the pipe. The inner surface 67, which may be roughened to prevent slipping, is of the same diameter as the pipe on which it is designed to be used, while the outer surface 68 is of a diameter enabling it to fit in the curved member 20 of the clamp.

While I have described the preferred form of my invention I do not wish to limit myself to the precise details shown, but wish to avail myself of such variations and modifications as may come within the scope of the appended claims.

The invention described herein may be manufactured and used by or for the Government of the United States of America for governmental purposes without the payment of any royalties thereon or therefor.

I claim:

1. In a device for separating two sections of pipe comprising a clamp adapted to be fastened to a pipe, a laterally projecting arm having an aperture formed therein fixed to said clamp, a rod adapted for insertion through said aperture, screw threads cut into one end of said rod and extending throughout a portion of its length, a machined head having a plurality of flat sides formed on the periphery of the other end of said rod, means adapted to bear against a rigid support adjacent said pipe, said means comprising a round disc having a flat surface on one side and a centrally cut opening having flat sides formed on the other side of said disc for receiving the flat sided end of said rod, and a nut positioned on the screw threaded end of said rod for exerting a force against said clamp for breaking the connection between said sections of pipe.

2. In a device for separating two sections of pipe comprising, a clamp adapted for fastening on one of said sections of pipe, oppositely disposed arms having apertures therein projecting outwardly from said clamp, spacing means between said clamp and said pipe, said spacing means comprising sections of cylindrical shell provided with roughened inner surfaces, a pair of rods respectively adapted for insertion through said apertures, screw threads on one end of said rods and a plurality of flat sides formed on the periphery of the other end of said rods, a pair of discs arranged to bear against a rigid support adjacent said pipe, each of said discs having a centrally cut opening forming a plurality of flat sides for receiving the flat sided ends of said rods, and a nut on the threaded portion of each of said rods which when turned exerts a force against said clamp and said rigid support for breaking the connection between said sections of pipe.

ROSS J. COOPER.

References Cited in the file of this patent

UNITED STATES PATENTS

| Number | Name | Date |
|---|---|---|
| 591,164 | Golar | Oct. 5, 1897 |
| 889,315 | Kenyon | June 2, 1908 |
| 1,316,753 | Williams | Sept. 23, 1919 |
| 1,326,426 | Shea | Dec. 30, 1919 |
| 1,690,012 | Hughes | Oct. 30, 1928 |

FOREIGN PATENTS

| Number | Country | Date |
|---|---|---|
| 1,838 | Austria | Aug. 10, 1900 |